INVENTOR

BY Aimé J. Grenier

Gerald B. Epstein Att'y.

United States Patent Office 3,718,920
Patented Feb. 27, 1973

3,718,920
POWER CONTROL SYSTEM HAVING
FAULT SENSING MEANS
Aime J. Grenier, North Attleboro, Mass., assignor to
Texas Instruments Incorporated, Dallas, Tex.
Filed Sept. 21, 1971, Ser. No. 182,398
Int. Cl. G08b 21/00
U.S. Cl. 340—248 E                                    15 Claims

ABSTRACT OF THE DISCLOSURE

A system for controlling the supply of electrical power from a balanced polyphase power source to a load such as the phase windings of an electrical motor in which means are provided for sensing improper application of the power to the load. A plurality of selectively energizable A.C. power switches each having first and second power terminals and a control terminal are adapted to couple associated ones of the power terminals of the source to the load. A substantially non-reactive, high impedance line neutral sensing network having a junction defining a line neutral point is connected across the first power terminals of the A.C. power switches, while a similar load neutral sensing network having a junction defining a load neutral point is connected across the second power terminals of the A.C. power switches. Means are coupled between the line neutral junction and the load neutral junction for sensing a difference in electrical potential therebetween as an indication of system mis-operation.

BACKGROUND OF THE INVENTION

The present invention relates generally to a power control system and more particularly is directed to an improved system for controlling the supply of power from a balanced polyphase power source to at least one load and for sensing improper application of the power to the load.

A variety of industrial power control systems are presently available for controlling the power being supplied to one or more loads such as the phase windings of an electric motor. However, particularly in recent years the increasing need for rapid operation with an extremely high degree of reliability, improved electrical lifetime, and resistances to mechanical shock has necessitated the substitution of various types of electronic devices for accomplishing the requisite switching functions replacing previously used mechanical switch devices. This has proven extremely advantageous in increasing the lifetime and reliability of such industrial power control systems and has also resulted in a more durable and rugged system. However, certain problems have arisen particularly since certain types of semi-conductor devices may suffer from electronic failure. Such failure is not readily detectable visually and in certain instances may be difficult to detect electrically in view of the tendency to package the associated switching circuitry in miniaturized enclosures which are often sealed to provide further protection for the devices, as well as to provide a more attractive finished product. Furthermore, in instances of failure of one or more of the electronic switching devices improper system operation may result without an immediate indication being available so that damage to associated equipment may occur.

Accordingly, it is an object of the present invention to provide an improved power control system in which means are provided for sensing improper operation.

It is another object of the present invention to provide an improved power control system in which improper application or non-application of power to a load is indicated.

It is still another object of the present invention to provide an improved power control system in which relatively inexpensive and simple means are provided for indicating improper system operation.

It is a further object of the present invention to provide an improved power control system in which visual indication of improper application or non-application of power to a load is provided.

Various additional objects and advantages of the present invention will become readily apparent from the following detailed description and accompanying drawings.

DESCRIPTION OF THE PREFERRED EMBODIMENTS

Figure 1:
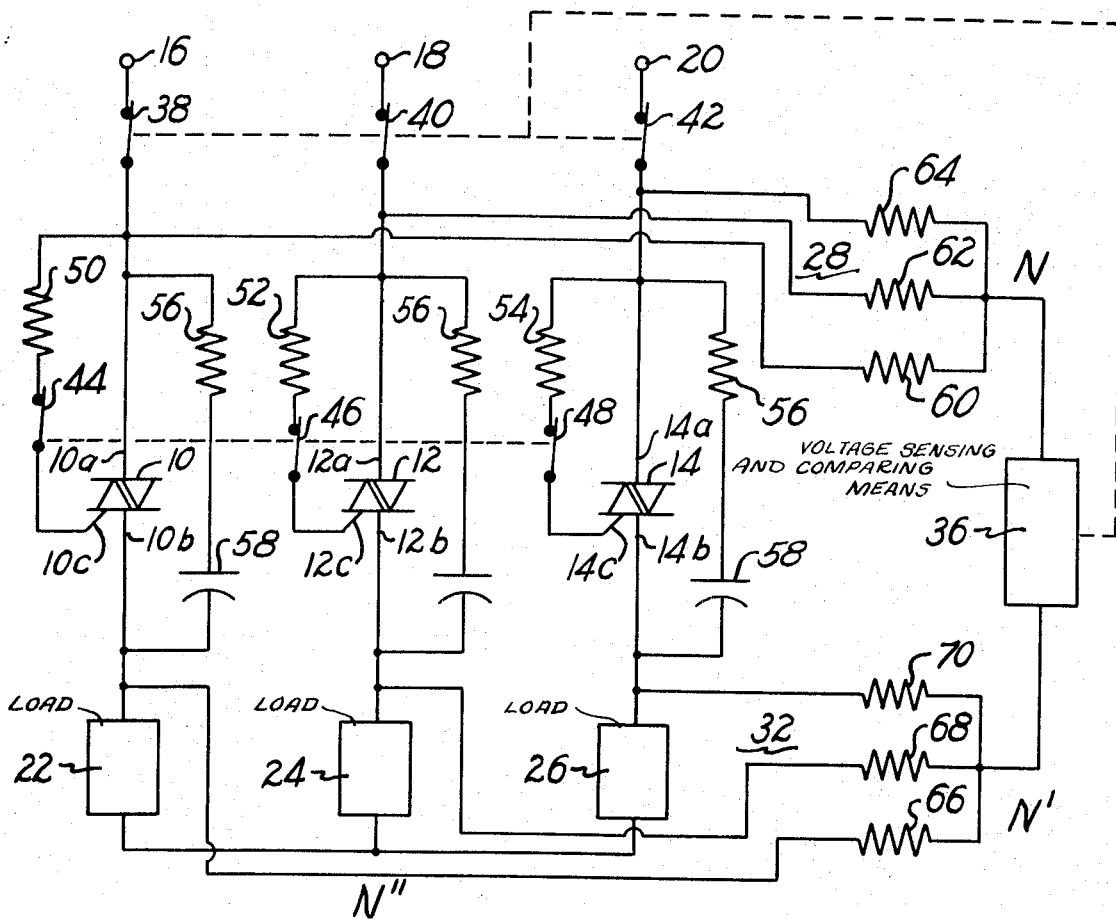
FIG. 1 is an electrical schematic circuit diagram of one embodiment of a power control system in accordance with the present invention.

Referring generally to the drawings and initially to FIG. 1, a power control system is illustrated including a plurality of selectively energizable A.C. power switches indicated by the reference numerals 10, 12 and 14 respectively. Each of these power switches includes first power terminals 10a, 12a and 14a and further includes second power terminals 10b, 12b and 14b. In addition, each of the A.C. power switches includes a control element 10c, 12c and 14c which is adapted to control conduction of the A.C. power switch between its associated power terminals. The first power terminals 10a, 12a and 14a of each of the A.C. power switches 10, 12 and 14 are connected to power terminals 16, 18 and 20 of a suitable balanced polyphase electrical power source (not shown) for selectively supplying power to associated loads 22, 24 and 26 respectively connected to the second power terminals 10b, 12b and 14b of the A.C. power switches. A substantially nonreactive, high impedance line neutral sensing network 28 having a common junction N defining a line neutral point is connected across the first power terminals 10a, 12a and 14a of the A.C. power switches 10, 12 and 14 and hence is also connected across the line power terminals 16, 18 and 20, while a substantially similar load neutral sensing network 32 having a junction N' defining a common load neutral point is connected across the second power terminals 10b, 12b and 14b of the A.C. power switches and hence is also connected across the loads 22, 24 and 26. The line neutral sensing network 28 and the load neutral sensing network 32 are arranged to sense the relative balance or unbalance of the voltage signals established across the first and second sets of power terminals of the A.C. power switches so as to enable an unbalanced condition to be sensed as an indication of improper operation. Accordingly, means 36 are coupled between the line neutral junction N and the load neutral junction N' for sensing and comparing the voltage signals at these respective junctions to indicate mis-operation.

More particularly, the power terminals 16, 18 and 20 which are adapted to be connected to the balanced polyphase power source are coupled to the first power terminals 10a, 12a and 14a of the A.C. power switches 10, 12 and 14 respectively through associated main switch contacts 38, 40 and 42, which may be operated by a suitable circuit breaker, or the like, the switch contacts being ganged for simultaneous opening and closing. In addition, the control elements 10c, 12c and 14c of the A.C. power switches are shown in a self-gating arrangement and are coupled to the power terminals 16, 18 and 20 respectively, as shown, through switch contacts 44, 46 and 48 and through associated voltage dropping resistors 50, 52 and 54 respectively. Consequently closing of the switch contacts 44, 46 and 48, when the main switch contacts 38, 40 and 42 are closed, permits the application of energizing signals from the power source to the control elements of the A.C. power switches so as to render the A.C. power switches conductive. In the illustrated embodiment the A.C. power switches 10, 12 and 14 preferably comprise suitable gate-controlled semi-conductor devices and are illustrated as triacs in which the respective first and second power terminals of each of the A.C. power switches comprise the anodes of the triac, while the control elements comprise the gates of the triacs. Similarly, if desired, other types of semi-conductor switching devices may be utilized such as silicon controlled rectifiers, transistors, etc. In addition, a d.v./d.t. suppression network including a serially connected resistor 56 and capacitor 58 is connected across the anodes of each of the triacs 10, 12 and 14, as shown, in order to prevent inadvertent turn-on of the triacs due to high voltage transients in the absence of the application of a gating signal. Furthermore, in the illustrated embodiment, although a plurality of loads 22, 24 and 26 are illustrated connected to each of the triacs and each being connected to a common neutral terminal designated by the letter N'', a single load or several loads may be utilized depending upon the power control function which is desired. In this regard the loads 22, 24 and 26 may comprise any desired resistive and/or inductive load for receiving the applied power from the polyphase power source, when the switch ontacts 38, 40 and 42 are closed and the triacs 10, 12 and 14 are rendered conductive.

The line neutral sensing network 28, as shown, comprises a plurality of resistors 60, 62 and 64 connected in a wye configuration across the first power terminals 10a, 12a, 14a of the triacs 10, 12, 14 for sensing the relative balance of the power being applied at each of these power terminals by the balanced polyphase power source. More particularly, the resistor 60 is connected between the power terminal 10a and the neutral junction N, the resistor 62 is connected between the power terminal 12a and the neutral junction N, and the resistor 64 is connected between the power terminal 14a and the neutral junction N. Accordingly, when the same relative voltage level is simultaneously developed across all of the first power terminals 10a, 12a and 14a of the triacs substantially equal, balanced voltage levels are developed across each of the resistors 60, 62, 64 and a predetermined voltage level is developed at the junction N. Similarly, the load neutral sensing network 32 comprises a plurality of substantially identical resistors 66, 68 and 70 respectively connected to the second power terminals 10b, 12b and 14b of the triacs 10, 12 and 14 for sensing the relative balance of the voltage which is being applied to the respective loads 22, 24 and 26. In this connection the resistors 66, 68 and 70 are similarly connected in a Y configuration to define the common neutral point N'. Thus, when the same relative voltage level is simultaneously developed across all of the second power terminals 10b, 12b and 14b substantially equal, balanced voltage levels are developed across each of the resistors 66, 68 and 70 and the predetermined voltage level is also developed at the junction N'. In operation, when all of the triacs 10, 12 and 14 are simultaneously in a conductive or non-conductive state, substantially equal voltage levels are developed across each of the resistors 66, 68 and 70 corresponding to the voltage levels developed across the resistors 60, 62 and 64 so that the same predetermined voltage level is established at the junction N and the junction N'. However, in the event one of the triacs remains in a conductive or a non-conductive condition while the other triacs are in an opposite condition i.e. non-conductive or conductive respectively, then the voltage level at the junction N' differs from the voltage level at the junction N and an indication of mis-operation of the system may be provided by sensing this difference in potential. Accordingly, the means 36 coupled between the junctions N and N' is employed for sensing the establishment of a potential difference therebetween. In this regard it should be noted that the condition whereby a difference of potential is established between the junctions N and N', which may be referred to as a displaced neutral, may occur due to triac failure, failure of the gating circuitry for the associated triacs, etc. but, nevertheless, the indication is provided that system mis-operation has occurred. In this connection the means 36 may comprise a suitable visual indicator such as a warning light, which is responsive to the establishment of a preselected voltage thereacross, which is somewhat less than the potential difference which it is anticipated may be established between the neutral junctions N and N' upon conduction or non-conduction of less than all of the triacs. Alternatively, an audio indicator may be utilized or, if desired, the means 36 may comprise a suitable relay network or the like which is coupled to the main switch contacts 38, 40 and 42 for effecting opening thereof upon excitement of the means 36 when the requisite voltage level is established thereacross.

Figures 2, 3:
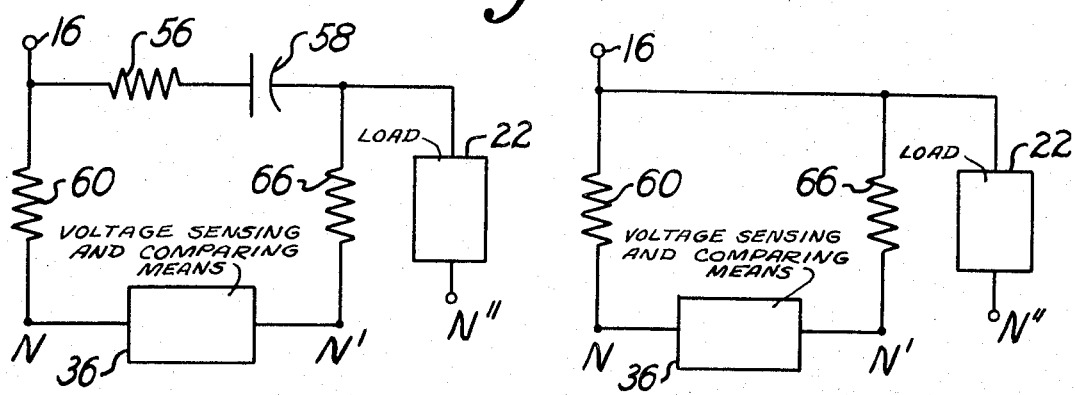
FIG. 2 is an electrical schematic circuit diagram representative of an equivalent circuit of a portion of the system illustrated in FIG. 1 under certain conditions.
FIG. 3 is an electrical schematic circuit diagram of the equivalent circuit of the same portion of the system illustrated in FIG. 2 under certain different conditions from that illustrated in FIG. 2.

Further explanation of the operation of the system is provided with reference to FIGS. 2 and 3 which respectively illustrate the equivalent circuit diagram on a line-to-neutral, per phase basis of one of the phases of the system shown in FIG. 1. More particularly, the phase coupled to power terminal 16 is shown for illustrative purposes, and is illustrated both when the triac 10 is in a non-conductive condition (FIG. 2) and when the triac 10 is in a conductive condition (FIG. 3). Initially, referring to FIG. 2, when the triac 10 is in a non-conductive condition, on a line-to-neutral basis the power terminal 16 is connected in parallel relationship with the serially connected resistor 56 and capacitor 58 and is connected through the resistor 66 of the load neutral sensing system to the neutral junction N' thereof, this junction in turn being coupled to the voltage sensing means 36, while the opposite side of the voltage sensing network 36 is shown connected to the neutral junction N which in turn is connected to the power terminal 16 through the resistor 60 of the line neutral sensing network. In addition, the load 22 is shown connected between the neutral junction N'' and electrically separated from the power terminal 16 by the high impedance provided by the serially connected resistance 56 and capacitor 58. It may be readily seen that when the triac is in a non-conductive condition and is blocking current properly the voltage at junction N' is substantially equal to the voltage at junction N and the sensing network 36 is not energized. Similarly, referring to FIG. 3 which illustrates the line-to-neutral equivalent circuit of the phase, including the triac 10 when the triac 10 is in a conductive condition it may be seen that the power terminal 16 is directly coupled to one side of the load 22 while the opposite side of the load 22 is coupled to the neutral N'', while the sensing network 36 coupled between junctions N' and N is connected at one end to the power terminal 16 through the resistor 60 of the line neutral sensing network via junction N and at its opposite end is connected to the power terminal 16 through the resistor 66 of the load neutral sensing network via junction N'. Accordingly, when the system is in balance no potential difference is developed across the neutral terminals N, N' and the sensing means 36 is not energized.

However, during operation of the system illustrated in FIG. 1 when less than all of the triacs are simultaneously in a conductive or non-conductive state the voltages across the various phases are out of relative balance and a voltage level is established across the junctions N, N' which excites or energizes the sensing means 36. For example, if the switches 38, 40 and 42 are all closed and the loads 22, 24 and 26 are to be energized upon similar closure of the switch contacts 44, 46 and 48 rendering the respective triacs 10, 12 and 14 conductive all of the phases should be in a condition illustrated in FIG. 3. However, if one of the triacs, for example, were not rendered conductive, the equivalent circuit of its associated phase would appear as shown in FIG. 2 and the voltages at the junctions N and N' would not be at the same level. Accordingly, the potential difference established between these junctions which would be sensed by the sensing means 36 as an indication of system mis-operation either due to triac failure, failure of the gating circuitry for the triac, etc. Similarly, if the switch contacts 44, 46 and 48 for the respective triacs were to be opened all of the phases should appear as shown in FIG. 2 but if one of the triacs, for example, should fail to be rendered non-conductive the equivalent circuit of its associated phase would appear as shown in FIG. 3 and once again a potential difference would be established between junctions N and N' so as to energize the sensing means 36 to provide an indication of system mis-operation.

Figure 4:
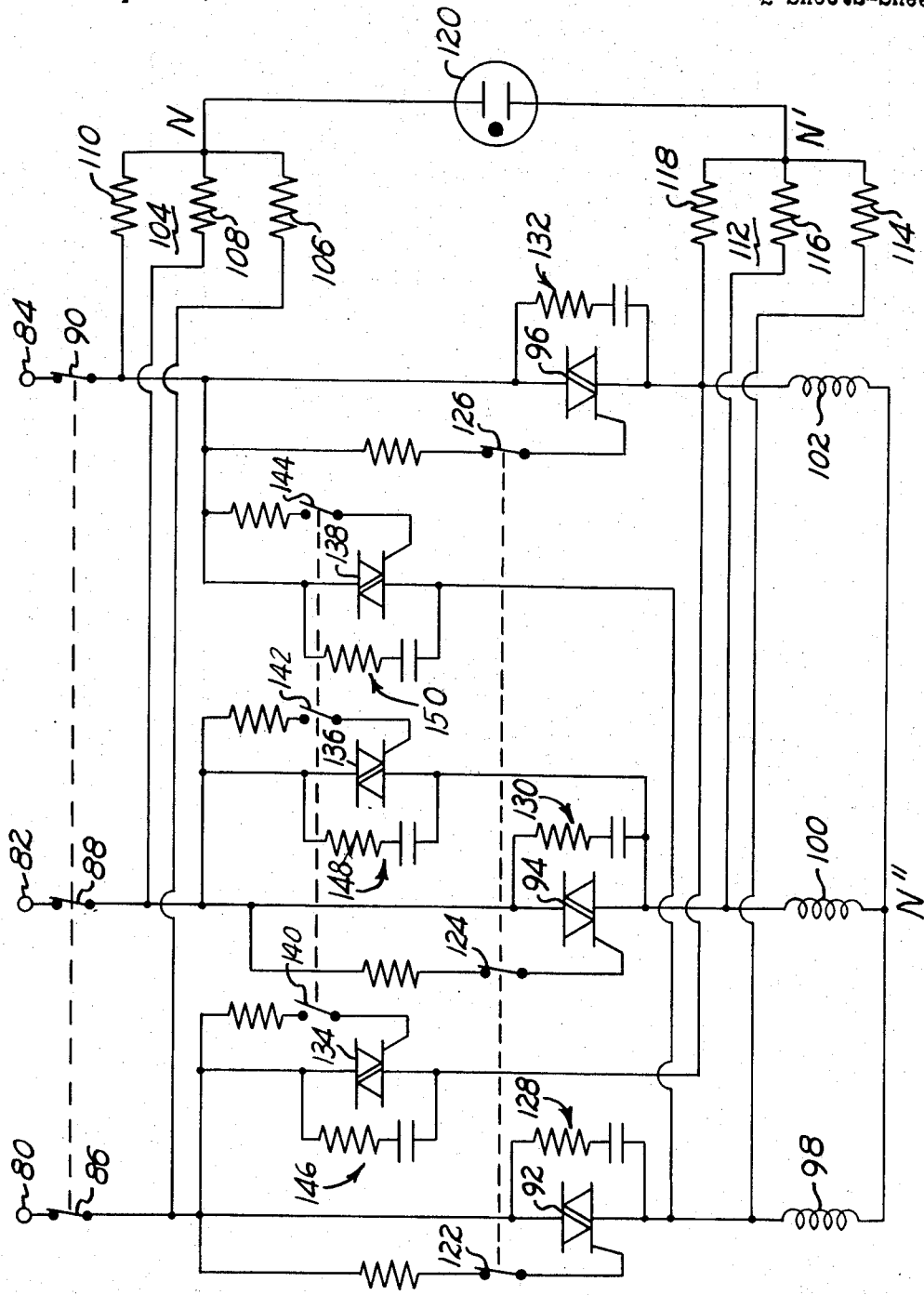
FIG. 4 is an electrical schematic circuit diagram of another embodiment of a power control system in accordance with the present invention.

Referring now to FIG. 4 a control system similar to that shown in FIG. 3 is illustrated. However, in the FIG. 4 embodiment the system is shown connected to a load comprising the phase windings of a typical A.C. motor and is arranged for effecting reversing control of the load or motor windings. More particularly, balanced polyphase A.C. power is again supplied through a plurality of power terminals 80, 82 and 84 through associated switch contacts 86, 88 and 90 and through associated gate controlled semi-conductor devices, illustrated as triacs 92, 94 and 96, which upon energization supply electrical power to a plurality of loads illustrated as motor windings 98, 100, 102 respectively. A line neutral sensing network 104 similar to the network 28 of the FIG. 1 embodiment and including a plurality of resistors 106, 108 and 110 is connected in a Y configuration across the input power terminals of the triacs 92, 94 and 96 respectively and includes a common line neutral junction N, while a load neutral sensing network 112 similar to the load neutral sensing network 32 is also provided including a plurality of resistors 114, 116 and 118 connected in a Y configuration across the output power terminals of the triacs 92, 94, 96 respectively as shown and also includes a common load neutral junction N'. An indicating means 120 illustrated as a voltage responsive device, comprising a neon bulb, is connected intermediate the junctions N and N' for providing visual indication of system mis-operation due to simultaneous conduction or non-conduction of less than all of the triacs 92, 94 and 96 similarly to the FIG. 1 embodiment. Energization of the triacs 92, 94 and 96 is similarly effected by the provision of suitable switch contacts 122, 124 and 126 coupled to the associated gates of the triacs for effecting the application of energizing signals thereto upon closure of these switches, when the main switches 86, 88 and 90 are in a closed condition. Similarly, suitable d.v./d.t. suppression networks indicated by the reference numerals 128, 130 and 132 are also provided connected across the power terminals of the respective triacs 92, 94 and 96. As shown, the power terminal 80 is connected to the motor winding 98 when the triac 92 is conductive, the power terminal 82 is connected to the motor winding 100 through the triac 94 when triac 94 is conductive and the power terminal 84 is connected to the motor winding 102 when the triac 96 is conductive. However, in the system illustrated in FIG. 4 reversal of the direction of operation of the motor represented by the motor windings 98, 100 and 102 may be conveniently achieved by opening the switch contacts 122, 124 and 126 and by closing switch contacts 140, 142 and 144 which are coupled to the respective gates of similar triacs 134, 136 and 138 which are selectively connectable between the power terminals and the loads. In this regard, as shown, the power terminal 80 is connected to the motor winding 102 through the triac 134 when the triac 134 is conductive, while the power terminal 84 is connected to the motor winding 98 through the triac 138 when the triac 138 is conductive. The power terminal 82 remains connected to the winding 100 through the triac 136 when the triac 136 is conductive, the triac 136 being provided primarily to effect symmetry of operation of the system, since the reversing operation is effected primarily by the interchange of the application of power between the power terminals 80 and 84 and the motor windings 98 and 102. In addition, suitable d.v./d.t. suppression networks 146, 148 and 150 are connected across the power terminals of the respective triacs 134, 136 and 138. System mis-operation is similarly detected when the triacs 134, 136 and 138 are rendered conductive and non-conductive respectively, in the event less than all of these triacs are simultaneously in a conductive or non-conductive condition, resulting in a difference of potential being developed between the line neutral terminal N and the load neutral terminal N', which is sensed by the voltage responsive neon bulb 120 causing lighting thereof as an indication of system mis-operation.

Thus, a unique power control system has been shown and described for effecting the application of power from a balanced polyphase power source to one or more loads such as the phase windings of an A.C. motor and providing an indication of mis-operation of the system.

Various changes and modifications will be readily apparent to those skilled in the art and any of such changes or modifications are deemed to be within the spirit and scope of the present invention as set forth in the appended claims.

I claim:

1. In a system for controlling the supply of electrical power from a balanced polyphase power source having a plurality of power terminals to at least one load and for sensing improper operation thereof, the system comprising;

a plurality of selectively energizable A.C. power switches each having first and second power terminals and a control terminal for controlling conduction between said first and second power terminals, said first and second power terminals of each of said A.C. power switches being adapted to couple associated ones of the power terminals of the power source to the at least one load, a substantially non-reactive, high impedance line neutral sensing network having a junction defining a line neutral point and being connected across said first power terminals of said A.C. power switches, a substantially non-reactive, high impedance load neutral sensing network having a junction defining a load neutral point and being connected across said second power terminals of said A.C. power switches, and means coupled between said line neutral junction and said load neutral junction for sensing a difference in electrical potential therebetween as an indication of mis-operation of one of said A.C. power switches.

2. A system in accordance with claim 1 wherein a predetermined difference in electrical potential is established between said line neutral junction and said load neutral junction responsive to conduction of at least one of said A.C. power switches and accompanying non-conduction of another of said A.C. power switches.

3. A system in accordance with claim 2 wherein said A.C. power switches comprise gate-controlled semi-conductor devices connectable to the power terminals of the power source in a manner whereby all of said gate-controlled semi-conductor devices are adapted to be substantially simultaneously rendered conductive or non-conductive absent misoperation thereof.

4. A system in accordance with claim 3 wherein said gate-controlled semi-conductor devices comprise triacs each having first and second anodes, one of said anodes being connectable to one of the power terminals of the power source and the other anode being connectable to said at least one load respectively.

5. A system in accordance with claim 2 wherein a voltage responsive indicator is connected between said line neutral junction and said load neutral junction, said voltage responsive indicator providing an indication responsive to the establishment of said predetermined difference in electrical potential.

6. A system in accordance with claim 2 wherein said line neutral sensing network and said load neutral sensing network each comprise a plurality of substantially identical resistance elements.

7. A system in accordance with claim 6 wherein said line neutral sensing network includes a plurality of first resistors respectively connected between said first power terminals of said A.C. power switches and said line neutral junction in a Y configuration and said load neutral sensing network includes a plurality of second resistors respectively connected between said second power terminals of said A.C. power switches and said load neutral junction in a Y configuration.

8. A system in accordance with claim 7 wherein a voltage responsive indicator is connected between said line neutral junction and said load neutral junction, said voltage responsive indicator providing an indcation responsive to the establishment of said predetermined difference in electrical potential.

9. A system in accordance with claim 8 wherein said voltage responsive indicator comprises a neon bulb for providing a visual indication responsive to the establishment of said predetermined difference in electrical potential.

10. A system in accordance with claim 8 wherein said predetermined voltage level is established between said line neutral junction and said load neutral junction responsive to concomitant conduction or non-conduction of less than all of said A.C. power switches when said predetermined difference in electrical potential is established across said voltage responsive indicator.

11. In a system for controlling the supply of electrical power from a balanced polyphase power source having a plurality of power terminals to at least one load and for sensing improper operation thereof, the system comprising:
a plurality of selectively energizable A.C. power switches each having first and second power terminals and a control terminal for controlling conduction between said first and second power terminals, said first and second power terminals of each of said A.C. power switches being adapted to couple associated ones of the power terminals of the power source to the at least one load,
first resistive means terminating at a common line neutral junction connected across said first power terminals of said A.C. power switches for establishing a first voltage level at said first power terminals,
second resistive means terminating at a common load neutral junction connected across said second power terminals of said A.C. power switches for establishing a second voltage level at said second power terminals, and
sensing means coupled between said line neutral junction and said load neutral junction for comparing the first and second voltage levels at said junctions, said sensing means being responsive to a preselected difference in the voltage levels at said junctions as a result of concomitant conduction or non-conduction of less than all of said A.C. power switches.

12. A system in accordance with claim 11 wherein said first and said second resistive means each comprise a plurality of substantially identical resistors connected in a wye configuration across said first power terminals and across said second power terminals respectively.

13. A system in accordance with claim 12 wherein said sensing means includes a voltage responsive visual indicator connected between said line neutral junction and said load neutral junction, said voltage responsive visual indicator being energized responsive to the establishment of said preselected difference in the voltage levels at said junctions.

14. In a system for controlling the supply of electrical power from a balanced polyphase power source having a plurality of power terminals to the phase windings of an electric motor load and for sensing improper power application, the system comprising:
a plurality of gate-controlled semi-conductor current switches each having first and second power terminals and a control terminal, said first and second power terminals being adapted to respectively connect the power terminals of the power source to the motor phase windings,
a line neutral sensing network including a plurality of substantially identical resistors connected in a wye configuration across said first power terminals and defining a common line neutral junction,
a load neutral sensing network including a plurality of substantially identical resistors connected in a wye configuration across said second power terminals and defining a common load neutral junction, and
means connected between said line neutral junction and said load neutral junction responsive to a preselected potential difference therebetween as a result of simultaneous conduction or non-conduction of less than all of said semi-conductor current switches.

15. A system in accordance with claim 14 wherein said means connected between said line neutral junction and said load neutral junction comprises a voltage responsive device which provides a visual indication responsive to the establishment of said preselected potential difference.

References Cited
UNITED STATES PATENTS

| | | | |
|---|---|---|---|
| 2,179,101 | 11/1939 | Read, Jr. | 340—253 R X |
| 2,813,243 | 11/1957 | Christian et al. | 340—253 E UX |
| 3,525,019 | 8/1970 | Lansch | 317—33.5 C X |
| 3,546,692 | 12/1970 | Salzer | 317—46 X |
| 3,609,461 | 9/1971 | Obenhaus et al. | 317—33.5 C |
| 3,646,398 | 2/1972 | Kotos | 317—33.5 C |
| 3,651,335 | 3/1972 | Tetsuji Shimizu et al. | 307—252 B X |

JOHN W. CALDWELL, Primary Examiner

D. MYER, Assistant Examiner